United States Patent

Gardner

[15] 3,646,912
[45] Mar. 7, 1972

[54] TIME-CONTROLLED ANIMAL ACCESS PERMITTING DEVICE

[72] Inventor: Joan E. Gardner, 11642 Kiowa St., Los Angeles, Calif. 90049

[22] Filed: Feb. 20, 1970

[21] Appl. No.: 13,099

[52] U.S. Cl. ..........................................119/51.12, 119/51.13
[51] Int. Cl. .............................................................A01k 5/02
[58] Field of Search ............119/51.11, 51.12, 51.13, 51.14, 119/51.15

[56] References Cited

UNITED STATES PATENTS

| | | | |
|---|---|---|---|
| 3,137,272 | 6/1964 | Lepper | 119/51.12 |
| 1,484,916 | 2/1924 | Vincent | 119/51.15 |
| 3,330,256 | 7/1967 | De Vaux | 119/51.12 |
| 3,532,075 | 10/1970 | Cooper | 119/51.12 |

*Primary Examiner*—Aldrich F. Medbery
*Attorney*—Spensley and Horn

[57] ABSTRACT

A time-controlled animal-feeding receptacle mounted device for disbursing food to animals at predetermined times. A feeding receptacle for holding animal food or liquid supports a covering member which is adapted to be opened at predetermined intervals thereby permitting access to the food or liquid without the manual intervention of a human being.

2 Claims, 4 Drawing Figures

PATENTED MAR 7 1972 3,646,912

INVENTOR.
JOAN E. GARDNER,
By Her Attorneys
Spensley & Horn.

3,646,912

TIME-CONTROLLED ANIMAL ACCESS PERMITTING DEVICE

BACKGROUND OF THE INVENTION

1. Field of the Invention

The present invention animal-feeding receptacle is generally related to those machanisms designed for dispensing food to animals and more specifically to automatic feeding dispensers.

2. Prior Art

With the commercial sale and distribution of animal-feeding products which do not have to be maintained in a refrigerated or canned environment prior to serving same to an animal, it has been evident that a need has arisen to provide means to simplify the feeding of domestic animals without the intervention of human beings. The devices disclosed by the prior art are generally adapted to the dispensing of food and liquid to nursing or grazing animals and thereby are adapted to be used as bulk distribution systems and not oriented toward domestic animals. The problems inherent in the devices described by the prior art is that there is substantially no way that the devices could be used by the owner of small, domestic animals such as cats and dogs. It has been an increasing problem to provide food and liquid for the animals at predetermined times while the owner of the animal is not available for that function. The devices disclosed by the prior art fail to meet such a need in that they are highly complex and large systems and therefore are inherently expensive.

The present invention solves those problems which the devices disclosed by the prior art have failed to resolve. An elapsed timing device typically capable of being set for periods up to 24 hours is combined with covering means for an animal feeding dish. The timing mechanism can be preset for periods such as 12 hours at which time the mechanism will time-out and open a cover thereby exposing the contents of the dish. By supplying a time controlled cover for the animal dish, the contents thereof can be exposed for animal consumption at predetermined times. This will enable the owner of the domestic animal to leave the animal unattended and insure that the dietary requirements of the animal are met.

SUMMARY OF THE INVENTION

It is an object of the present invention to provide an animal-feeding receptacle which will be accessible at predetermined times.

It is another object of the present invention to provide a time-controlled animal-feeding receptacle adapted for use with domestic animals.

It is yet another object of the present invention to provide a time-controlled feeding apparatus which can be combined with conventional feeding receptacles.

It is still yet another object of the present invention to provide a time-controlled animal-feeding receptacle which is inexpensive and simple to manufacture.

In order to meet the objectives of the present invention, a conventional feeding dish or other food receptacle is provided. An elapsed timing device which is capable of being manually set for predetermined periods up to 24 hours is adapted to switch an opening device upon the expiration of the preset time. During the time interval following the establishment of the preset timing period and up until the expiration of the preset timing interval, the contents of the feeding dish shall remain covered by a covering member connected to the opening device. Upon the happening of the event whereat the preset time has expired, the covering member shall be raised thereby exposing the contents of the feeding dish. Since some of the available animal food products will not spoil while being maintained within the present invention animal feeding receptacle, the animal gaining access thereto can be fed without any danger that the food is unsafe for its consumption.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

DESCRIPTION OF THE PRESENTLY PREFERRED EMBODIMENT

Figure 1:
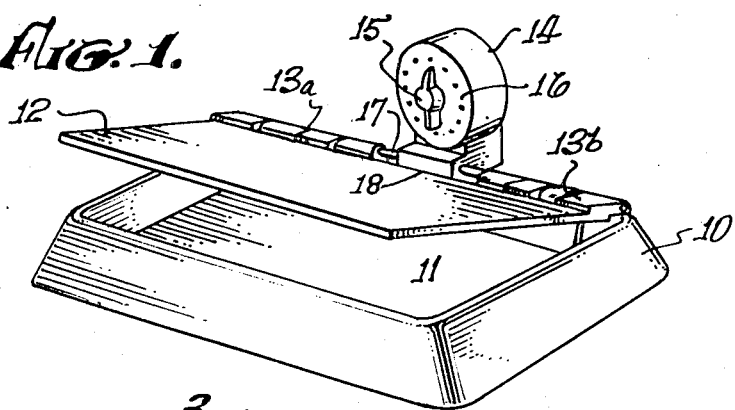
FIG. 1 is a perspective view of a form of the present invention.

An understanding of the present invention animal-feeding receptacle can be best gained by reference to FIG. 1. FIG. 1 illustrates an animal-feeding dish 10 adapted in accordance with the present invention. A timing device 14 with an elapsed time dial 16 and an elapsed time pointer 15 is cooperatively engaged to feeding dish 10. Rotatable shafts 17 driven from timing device 14 are secured to covering member 12, rotatable shafts 17 being guided by conventional hinges 13a and 13b. The alternate action of rotatable shafts 17 will open and close covering member 12 thereby exposing and enclosing interior 11 of feeding dish 10.

Timing device 14 is a conventional timing mechanism which registers the elapsed time preset by the placement of pointer 15 along dial 16. Upon the expiration of the predetermined time interval, indicated on elapsed time dial 16, rotatable shafts 17 will be activated by timing device 14. Shafts 17 are rotatably coupled to timing device 14 in a conventional manner permitting rotation thereof at the end of the predetermined timing interval. The rotation of shafts 17 will transmit the tortional force to covering member 12 thereby permitting exposure of interior 11 of feeding dish 10 after the proper interval. In order to provide ample access to interior 11, aperture 18 is provided in covering member 12, aperture 18 permitting clearance of timing pointer 15 when covering member 12 is raised exposing the food contained within feeding dish 10.

Figure 2:
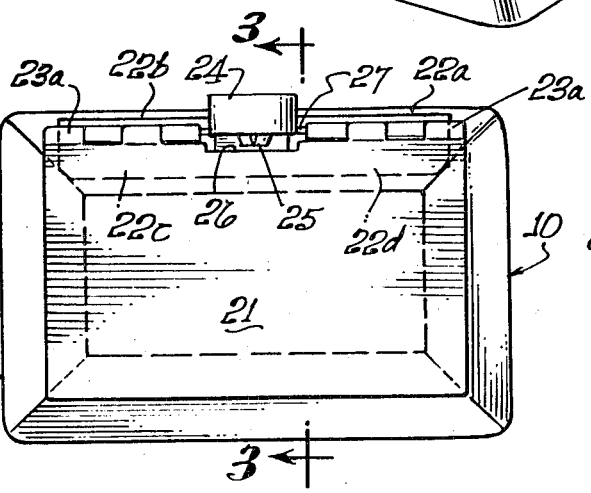
FIG. 2 is a top view of another form of the present invention.
Figure 3:
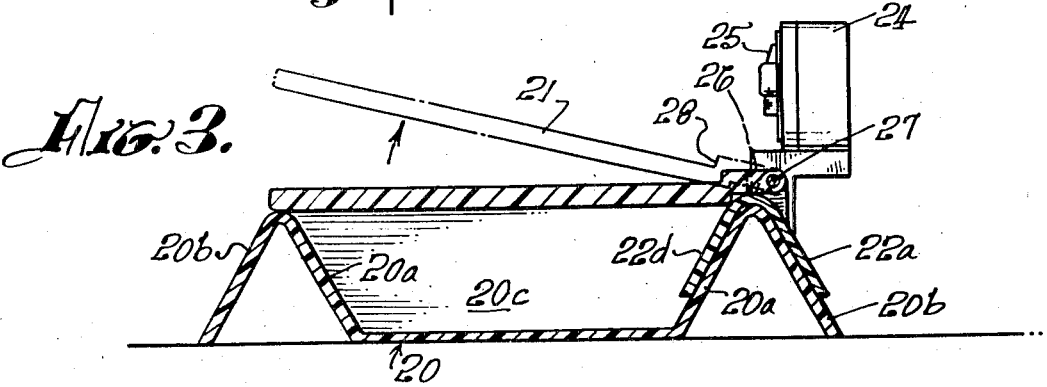
FIG. 3 is an enlarged sectional view along line 3—3 of FIG. 2.

Another form of the present invention can be best understood by reference to FIG. 2 and FIG. 3. The form of the present invention shown in FIG. 2 and FIG. 3 is adapted to be mounted upon an independent and separable feeding dish 20, thereby permitting the user to take advantage of the presence of a preexisting feeding dish 20. The manner in which the portable form of the present invention is used can be best seen by reference to FIG. 2 and FIG. 3. Feeding dish 20 is shown to have enclosing ridges 20a and 20b, ridge 20a defining the cavity 20c for placement of the animal food. Ridges 20a and 20b are tapered inwardly and meet at an apex along the top edge of feeding dish 20, ridges 20a and 20b defining an inverted V-shaped structure. Elapsed timing device 24 with setable pointer 25 are mounted upon feeding dish 20 by way of supports 22. Supports 22a and 22d and supports 22b and 22c respectively define substantially the same shape as ridges 20a and 20b. In the case of the embodiment shown in FIG. 2 and FIG. 3, the sectional profile of supports 22a and 22d correspond to the inverted V-shaped structure of feeding dish 20. It will be obvious to one skilled in the art that supports 22a and 22d and supports 22b and 22c could be any shape suitable to interface with a conventional feeding dish.

Covering member 21 is secured to timing device 24 through the interengagement with rotatable shaft 27. Rotatable shaft 27 will rotate in a suitable direction upon the expiration of the elapsed time set at timing device 24, the interaction of rotatable shaft 27 and timing device 24 being by conventional methods, and not a part of the present invention. Rotatable shaft 27 is affixed to covering member 21 and guided in hinges 23a and 23b. Upon the expiration of the predetermined time interval, the rotational torque exhibited by rotatable shaft 27 will be transmitted to covering member 21. Aperture 26 is disposed in the portion of the covering member 21 substantially adjacent the timing device 24. It is an object of the present invention to provide access to interior 20c of feeding dish 20 in the most simplified manner thereby facilitating access thereto by the animal. Aperture 26 permits covering member 21 to vertically clear the structure of timing device 24 and subsequently provide total access to interior 20c of feeding dish 20.

The form of the present invention shown in FIG. 3 has a covering member 21 which is adapted to substantially mate with the upper periphery of feeding dish 20 defined by the apex of ridges 20a and 20b. Since the portable form of the present invention will be secured to the ridges 20a and 20b by frictional and gravitational forces, covering member 21 has a portion to substantially cover interior 20c, said portion being substantially coplanar with a second portion encompassing aperture 26. The two portions extend outwardly in coplanar, opposite directions from folded edge 28. It would be obvious to one having skill in the art that folded edge 28 could be adapted to permit covering member 21 to fit any size feeding dish 20.

Timing device 24 is a conventional elapsed timing mechanism and is not part of the present invention. Supports 22a, 22b, 22c and 22d are fabricated of a suitable, sturdy material which will permit interengagement with commercially available feeding dishes 20. Covering member 21 will be rotated through the torque imposed by rotatable shaft 27, and therefore should be fabricated of lightweight material, such as plastic. Upon the expiration of the timing intervals set at timing pointer 25 on timing device 24, rotational shaft 27 shall rotate in a manner which will raise covering member 21 to its full vertical extent thereby exposing interior 20c of feeding dish 20 and the animal food contents contained therein.

Figure 4:
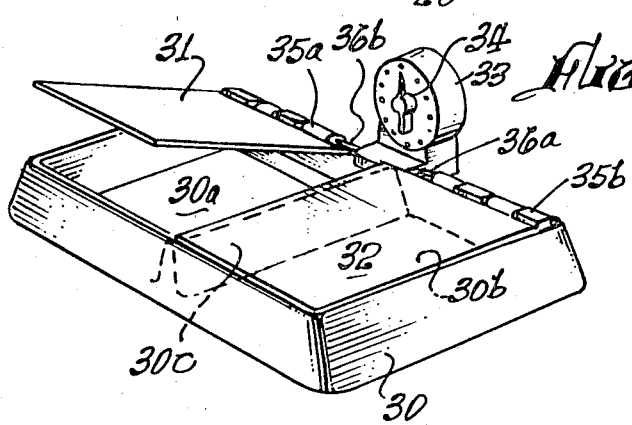
FIG. 4 illustrates yet another form of an animal-feeding receptacle in accordance with the present invention.

Another alternative form of the present invention can be best seen by reference to FIG. 4. Whereas the devices shown in FIG. 1, FIG. 2 and FIG. 3 were utilized to open a covering member thereby exposing the full contents of the interior of the feeding dish involved, that shown in FIG. 4 serves a dual purpose. Referring now to FIG. 4, feeding dish 30 has two interior compartments 30a and 30b separated by interior vertical wall 30c. Elapsed timing device 33 with setable pointer 34 is secured to feeding dish 30. Rotatable shafts 36a and 36b are independently coupled to elapsed timing device 33, each rotatable shaft 36a and 36b adapted to be rotated upon independent settings of timing pointer 34. Rotatable shaft 36a is secured to covering member 32, and rotatable shaft 36b is secured to covering member 31, rotatable shafts 36a and 36b being substantially aligned with feeding dish 30 via hinges 35a and 35b.

Elapsed timing device 33 will permit the initiation of two independent elapsed time intervals, and therefore on the expiration of each, one of the covering members 31 and 32 will respectively be raised exposing interior 30a and 30b. Elapsed timing device 33 is a conventional elapsed timing device which permits more than a single setting upon the expiration of which rotational torque can be applied to the independently coupled rotatable shafts 36a and 36b. Feeding dish 30 is a conventional member, and is preferably fabricated of plastic. Covering members 31 and 32 must be raised through the rotational torque of shafts 36a and 36b and therefore are preferably fabricated of lightweight material such as plastic.

The present invention animal-feeding receptacle provides an inexpensive, easily fabricated device which will permit the owner of a domestic animal to make nonspoilable food available to the particular animal without any manual intervention of the human being. By the mere setting of the particular timing device, the covering member will be opened at a predetermined time thereby giving the animal access to the food.

I claim:

1. In combination with an animal feeding receptacle having sidewalls defining a food-holding cavity, a time-controlled animal-feeding apparatus comprising:
    a. at least one receptacle sidewall receiving support member of substantially the same shape as the sidewall of the feeding receptacle and in juxtaposition to the receptacle sidewall for being supported thereon;
    b. an elapsed timing member coupled to said support member;
    c. a rotatable shaft coupled to said elapsed timing member; and
    d. a covering member substantially the same shape as the sidewall defining the food-holding cavity and secured to said rotatable shaft and in pivotal relation to said support member constituting a means for pivoting and raising said covering member upon the expiration of predetermined timing intervals to provide the animal access to the food-holding cavity.

2. A time-controlled animal-feeding apparatus as defined in claim 1 wherein said covering member extends beyond the sidewall of the feeding receptacle.

* * * * *